US012275609B2

(12) United States Patent
Tanisaki (10) Patent No.: US 12,275,609 B2
(45) Date of Patent: Apr. 15, 2025

(54) DOCUMENT READING APPARATUS THAT PERMITS OR INHIBITS TRANSPORT OF DOCUMENT THROUGH HORIZONTAL TRANSPORT ROUTE, DEPENDING ON STATUS OF DISCHARGE TRAY, AND IMAGE FORMING APPARATUS

(71) Applicant: KYOCERA Document Solutions Inc., Osaka (JP)

(72) Inventor: Yukio Tanisaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 163 days.

(21) Appl. No.: 18/228,962

(22) Filed: Aug. 1, 2023

(65) Prior Publication Data

US 2024/0051781 A1 Feb. 15, 2024

(51) Int. Cl.
| | |
|---|---|
| *B65H 29/60* | (2006.01) |
| *B65H 1/04* | (2006.01) |
| *B65H 5/26* | (2006.01) |
| *H04N 1/00* | (2006.01) |
| *H04N 1/12* | (2006.01) |

(52) U.S. Cl.
CPC .............. *B65H 29/60* (2013.01); *B65H 1/04* (2013.01); *B65H 5/26* (2013.01); *H04N 1/00037* (2013.01); *H04N 1/00411* (2013.01); *H04N 1/00811* (2013.01); *H04N 1/00814* (2013.01); *H04N 1/00824* (2013.01); *H04N 1/1215* (2013.01); *B65H 2405/324* (2013.01); *B65H 2405/3321* (2013.01); *B65H 2551/21* (2013.01); *B65H 2601/11* (2013.01); *B65H 2801/39* (2013.01)

(58) Field of Classification Search
CPC ........ B65H 2801/39; B65H 2405/3321; B65H 2405/324; B65H 29/60
See application file for complete search history.

(56) References Cited

U.S. PATENT DOCUMENTS

2024/0359939 A1\* 10/2024 Isoda .................... B65H 31/02

FOREIGN PATENT DOCUMENTS

JP 2011086988 A 4/2011

\* cited by examiner

*Primary Examiner* — Jeremy R Severson
(74) *Attorney, Agent, or Firm* — IP Business Solutions, LLC.

(57) ABSTRACT

A document reading apparatus includes a first discharge tray that assumes a closed state or an open state, by pivoting about a first pivotal shaft, a first transport route linearly extending from a document tray to the first discharge tray, a first reading device that reads an image of the document, a transport device that transports the document through the first transport route, and a controller that, when an instruction to read the document is inputted to an input device, restricts the transport device from transporting the document and the first reading device from reading the image, when the closed state or a full state of the first discharge tray is detected by a first detector, and allows the transport device to transport the document and the first reading device to read the image, when neither of the closed state and the full state is detected by the first detector.

6 Claims, 9 Drawing Sheets

MAIN SCANNING DIRECTION

Fig.4B

MAIN SCANNING DIRECTION

DOCUMENT READING APPARATUS THAT PERMITS OR INHIBITS TRANSPORT OF DOCUMENT THROUGH HORIZONTAL TRANSPORT ROUTE, DEPENDING ON STATUS OF DISCHARGE TRAY, AND IMAGE FORMING APPARATUS

INCORPORATION BY REFERENCE

This application claims priority to Japanese Patent Application No. 2022-127200 filed on Aug. 9, 2022, the entire contents of which are incorporated by reference herein.

BACKGROUND

The present disclosure relates to a document reading apparatus and an image forming apparatus, and in particular to a technique to control transport of a document, depending on the status of a discharge tray.

Some of existing document reading apparatuses provided with an automatic document feeder (ADF) are configured to switch a transport route, depending on a type of the source document. For example, such a technique is known including discharging an ordinary document through a curved transport route, and discharging a small-sized hard document, such as a business card or a license, through a horizontal transport route that is not curved.

SUMMARY

The disclosure proposes further improvement of the foregoing techniques.

In an aspect, the disclosure provides a document reading apparatus including a document tray, a first discharge tray, a first transport route, a first reading device, a transport device, an input device, a first detection device, and a control device. On the document tray, a document is placed. The first discharge tray assumes one of a closed state and an open state, by being made to pivot about a predetermined first pivotal shaft. The first transport route extends from the document tray to the first discharge tray, without being curved. The first reading device is provided on the first transport route, and reads an image on one face of the document. The transport device transports the document from the document tray to the first discharge tray, through the first transport route. To the input device, an instruction from a user is inputted. The first detection device detects a status of the first discharge tray. The control device includes a processor, and acts, when the processor executes a control program, as a controller that, in a case where an instruction to read the document with the first reading device is inputted to the input device, restricts the transport device from transporting the document and the first reading device from reading the image, when one of the closed state and a full state of the first discharge tray is detected by the first detection device, and allows the transport device to transport the document and the first reading device to read the image, when neither of the closed state and the full state is detected by the first detection device.

In another aspect, the disclosure provides an image forming apparatus including the foregoing document reading apparatus and an image forming device. The image forming device forms an image read by the document reading apparatus, on a recording medium.

DETAILED DESCRIPTION

Hereafter, a document reading apparatus and an image forming apparatus according to an embodiment of the disclosure will be described, with reference to the drawings.
Configuration of Image Forming Apparatus 1

Figure 1:
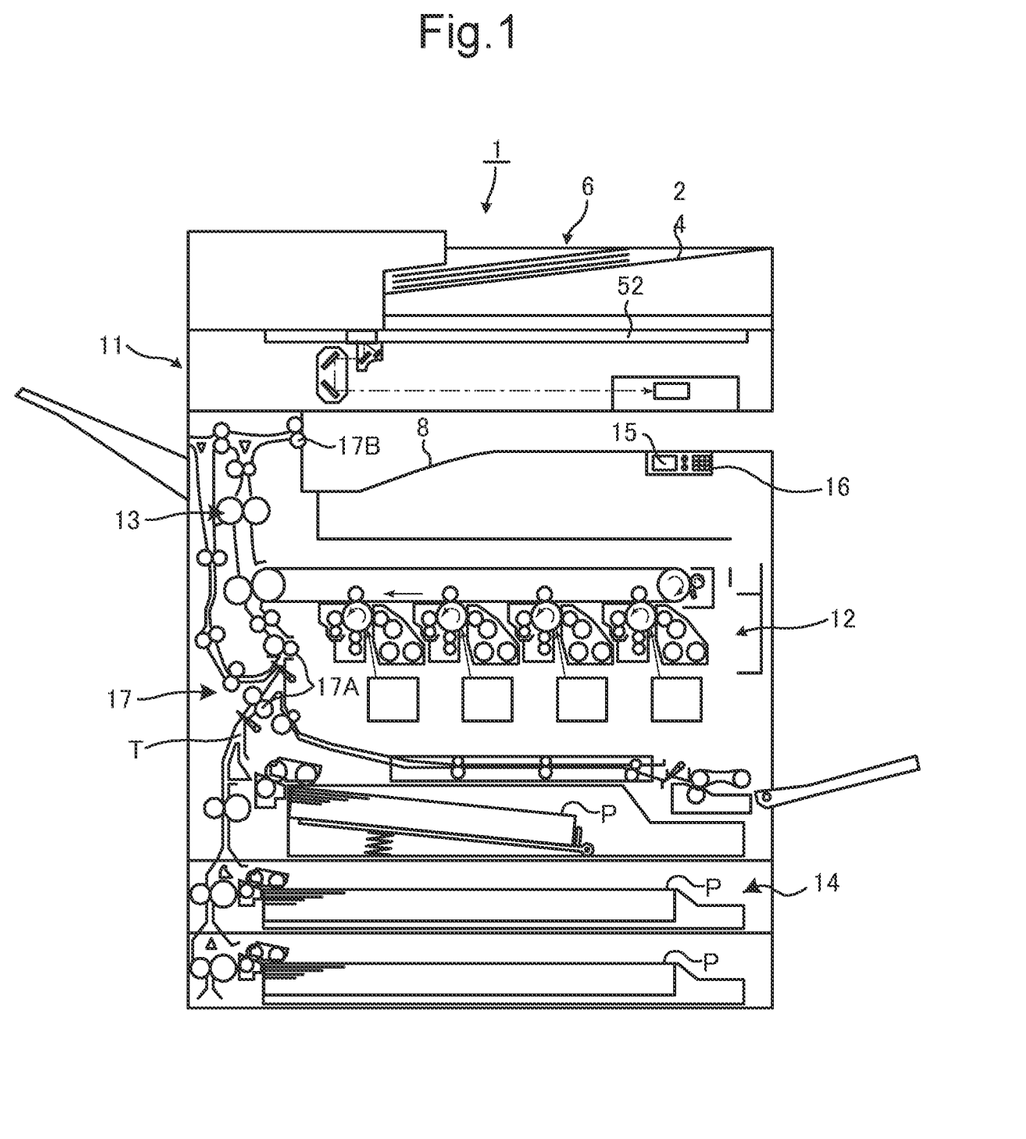
FIG. 1 is a front cross-sectional view showing a structure of an image forming apparatus.
Figure 2:
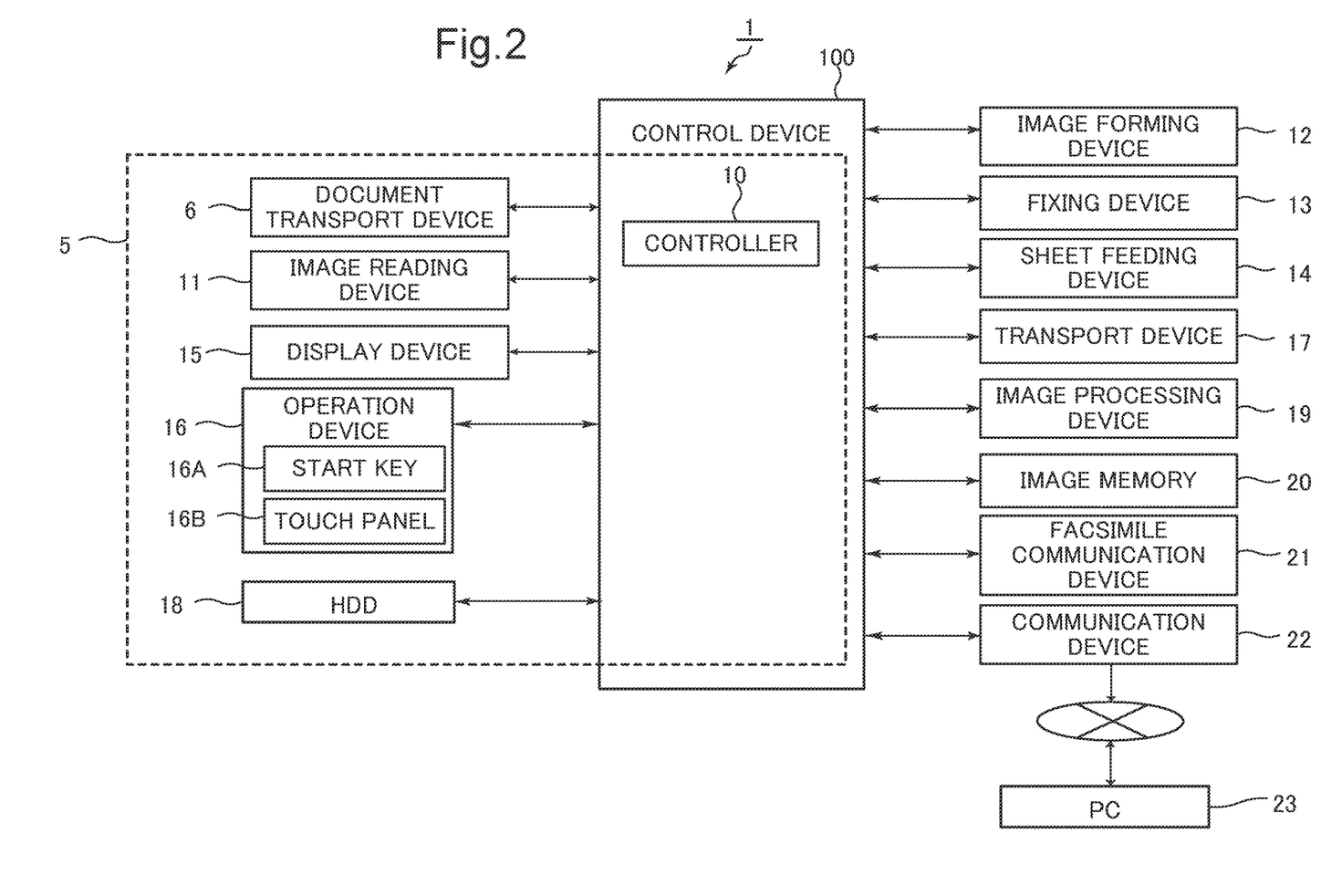
FIG. 2 is a block diagram showing a configuration of the image forming apparatus.

FIG. 1 is a front cross-sectional view showing a structure of the image forming apparatus 1, including the document reading apparatus 5 according to the embodiment of the disclosure. FIG. 2 is a block diagram showing a configuration of the image forming apparatus 1.

As shown in FIG. 1 and FIG. 2, the image forming apparatus 1 is a multifunction peripheral having a plurality of functions, such as copying, transmitting, printing, and facsimile transmission. The image forming apparatus 1 includes a document transport device 6, an image reading device 11, an image forming device 12, a fixing device 13, a sheet feeding device 14, a display device 15, an operation device 16, and a transport device 17.

The document transport device 6 transports a document placed on the document tray 24. The image reading device 11 reads the document, either through a moving document reading operation including optically reading the document being transported by the document transport device 6, or a fixed document reading operation including optically reading the document placed on a contact glass 52, and generates image data representing the document image. The configuration of the document transport device 6 and the image reading device 11 will be subsequently described, in further detail.

The image forming device 12 includes a photoconductor drum, a charging device, an exposure device, a development device, and a transfer device. The image forming device 12 forms a toner image on a recording sheet P, transported by the transport device 17 along a transport route T, on the basis of the image data generated by the document reading device 11, or image data inputted through a communication device 22.

The fixing device 13 heats and presses the recording sheet P on which the toner image has been formed by the image forming device 12, to thereby fix the toner image onto the recording sheet P. The recording sheet P on which the toner image has been fixed by the fixing device 13 is transported by the transport device 17, and delivered to an output tray 8.

The sheet feeding device 14 includes a manual bypass tray, and a plurality of sheet cassettes. The sheet feeding device 14 draws out, with a pickup roller, the recording sheets P stored in one of the plurality of sheet cassettes, or the recording sheets placed on the manual bypass tray, and delivers the recording sheet to the transport route T.

The display device 15 is, for example, constituted of an LCD or an organic light-emitting diode (OLED) display. The display device 15 displays various types of screen related to the functions that the image forming apparatus 1 is configured to perform.

The operation device 16 includes a plurality of hard keys, such as a start key 16A for instructing the start of the functions that the image forming apparatus 1 is configured to perform. The operation device 16 also includes a touch panel 16B overlaid on the display device 15. The operation device 16 is configured to receive instructions from the user.

The transport device 17 includes a transport roller pair 17A, a delivery roller pair 17B, and a transport motor connected to the transport roller pair 17A and the delivery roller pair 17B. When the transport motor drives the transport roller pair 17A and the delivery roller pair 17B so as to rotate, the recording sheet P delivered from the sheet feeding device 14 is transported along the transport route T, toward the image forming device 12 and then to the output tray 8.

The image forming apparatus 1 also includes a control device 100. The control device 100 includes a processor, a random-access memory (RAM), a read-only memory (ROM), and so forth. The processor is, for example, a central processing unit (CPU), a micro processing unit (MPU), or an application specific integrated circuit (ASIC).

The control device 100 is electrically connected to the document transport device 6, the image reading device 11, the image forming device 12, the fixing device 13, the sheet feeding device 14, the display device 15, the operation device 16, the transport device 17, a hard disk drive (HDD) 18, an image processing device 19, an image memory 20, a facsimile communication device 21, and the communication device 22. The document transport device 6, the image reading device 11, the display device 15, the operation device 16, the HDD 18, and the control device 100 constitute the document reading apparatus 5.

The control device 100 acts as a controller 10, when the processor executes a control program stored in the ROM or the HDD 18. The controller 10 serves to control the overall operation of the image forming apparatus 1. To be more detailed, the controller 10 controls the operation of each of the components of the image forming apparatus 1. Here, the controller 10 may be constituted of a logic circuit, instead of being realized by the operation according to the control program.

The HDD 18 is a large-capacity storage device for storing various types of data, such as the image data. The HDD 18 contains control programs for realizing the functions of the image forming apparatus 1. As an example of the various programs, the HDD 18 contains a transport control program for executing a horizontal transport operation according to the embodiment of the disclosure.

The image processing device 19 executes, as necessary, the image processing to the image data generated by the image reading device 11. The image memory 20 includes a region for temporarily storing the image data generated by the image reading device 11. The facsimile communication device 21 makes connection to the public telephone line, and transmits and receives the image data via the public telephone line.

The communication device 22 includes a communication module such as a local area network (LAN) board. The communication device 22 performs data communication with an external device such as a personal computer (PC), through a network.

A power source is provided for each of the components of the image forming apparatus 1, so that those components are activated with the power supplied from the power source.

Figure 3A:
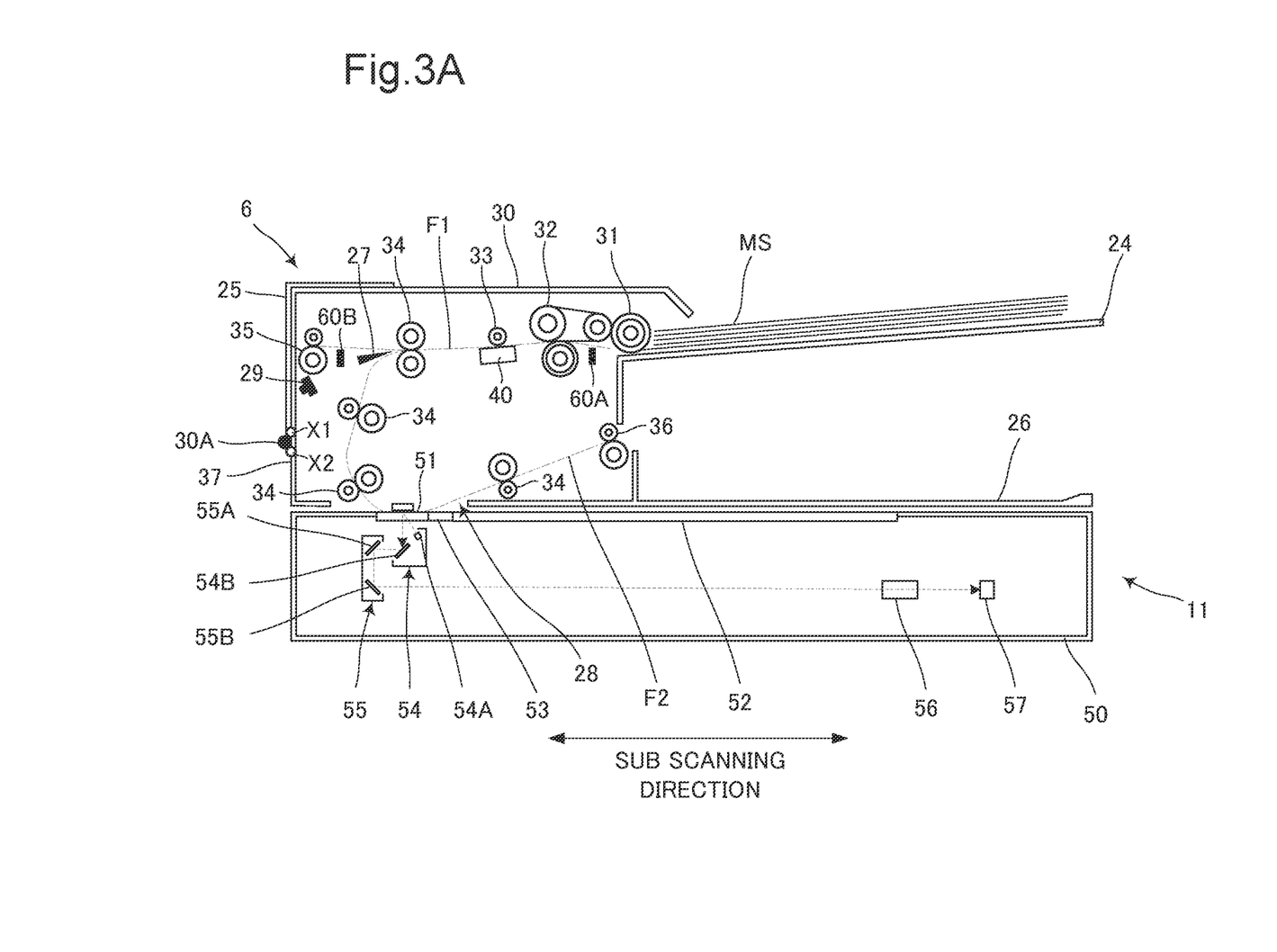
FIG. 3A is a cross-sectional view showing a document transport device and an image reading device, in a state where a sheet feeder cover and a first discharge tray are closed.
Figure 3B:
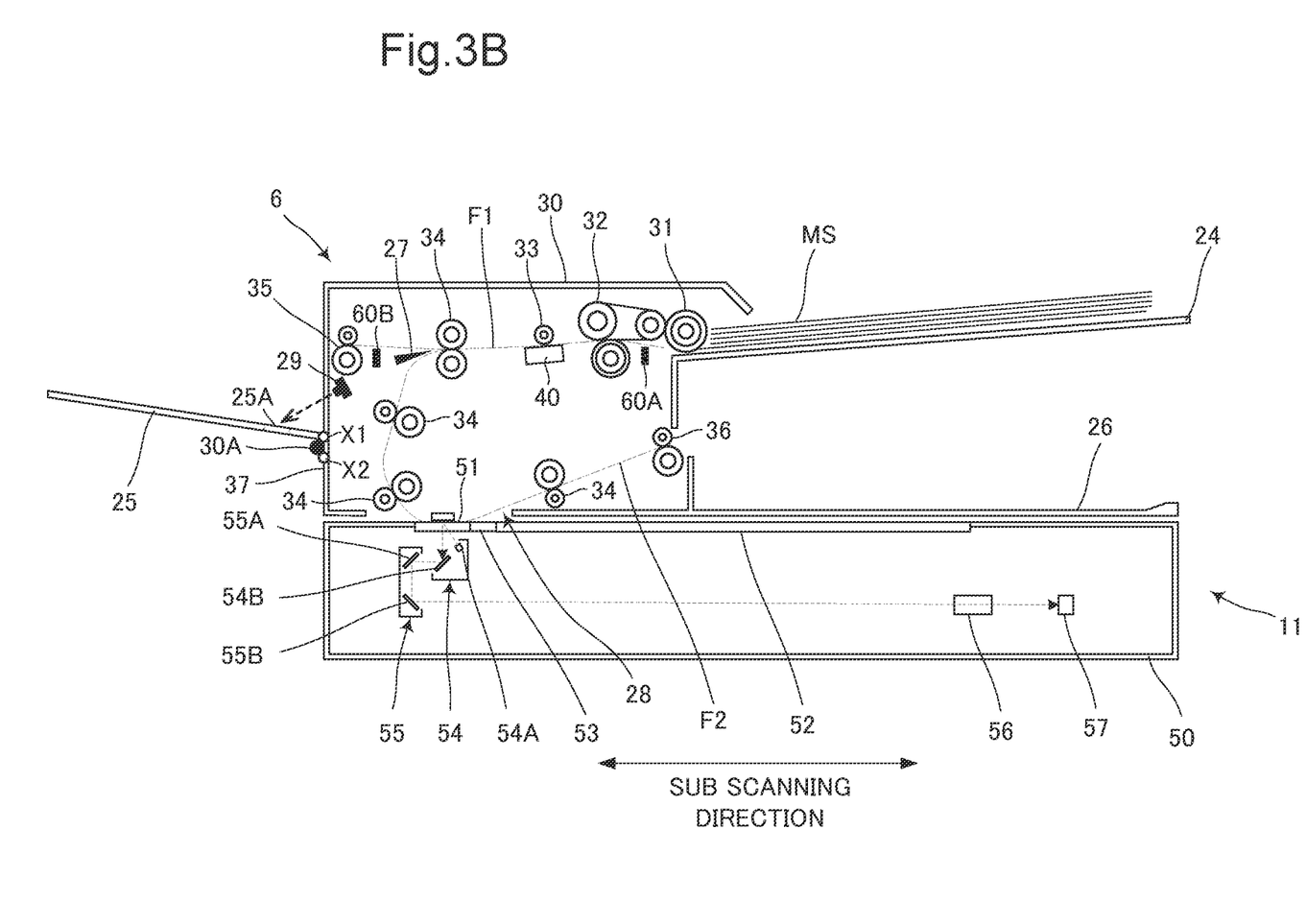
FIG. 3B is a cross-sectional view showing the document transport device and the image reading device, in a state where the sheet feeder cover and the first discharge tray are open.
Figure 4A:
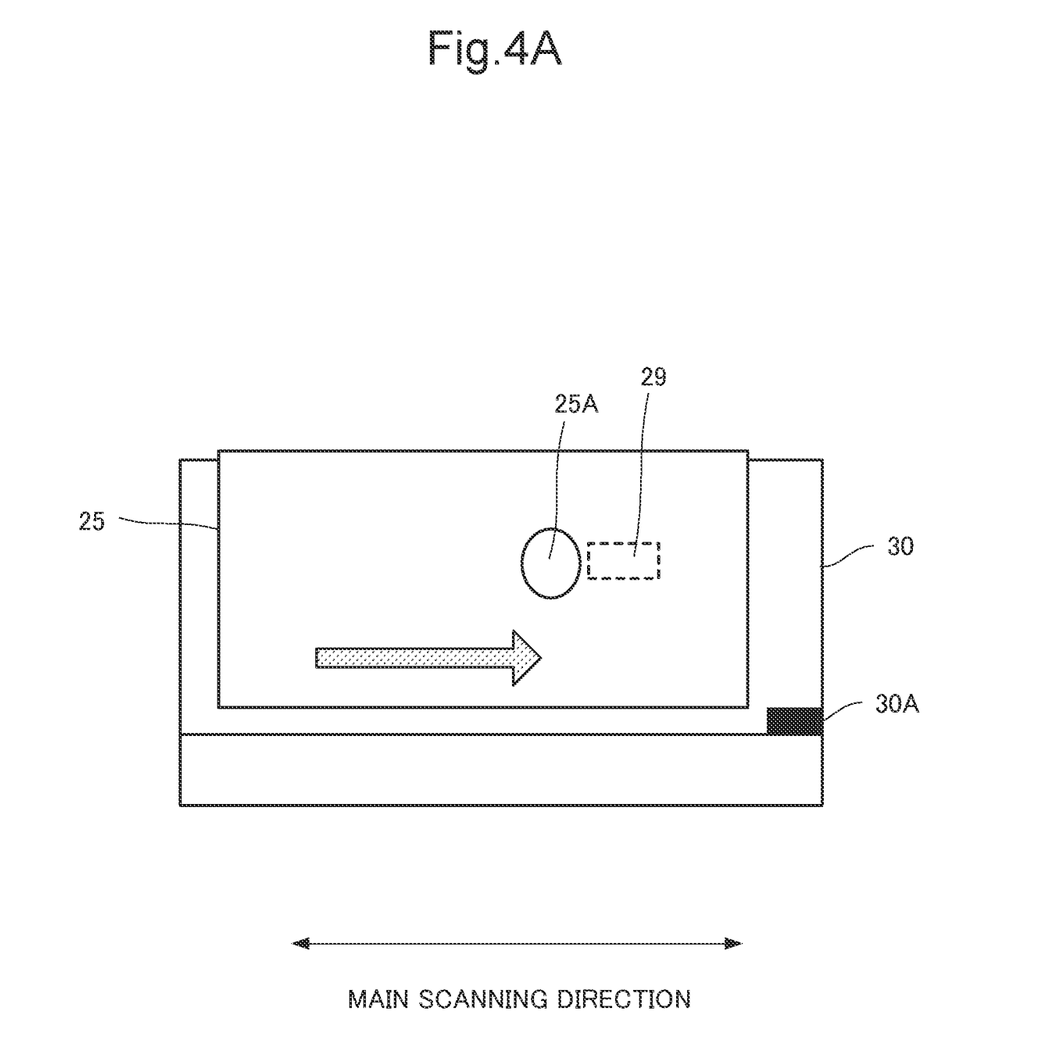
FIG. 4A is a side view showing the document transport device, in the state where the first discharge tray is closed.
Figure 4B:
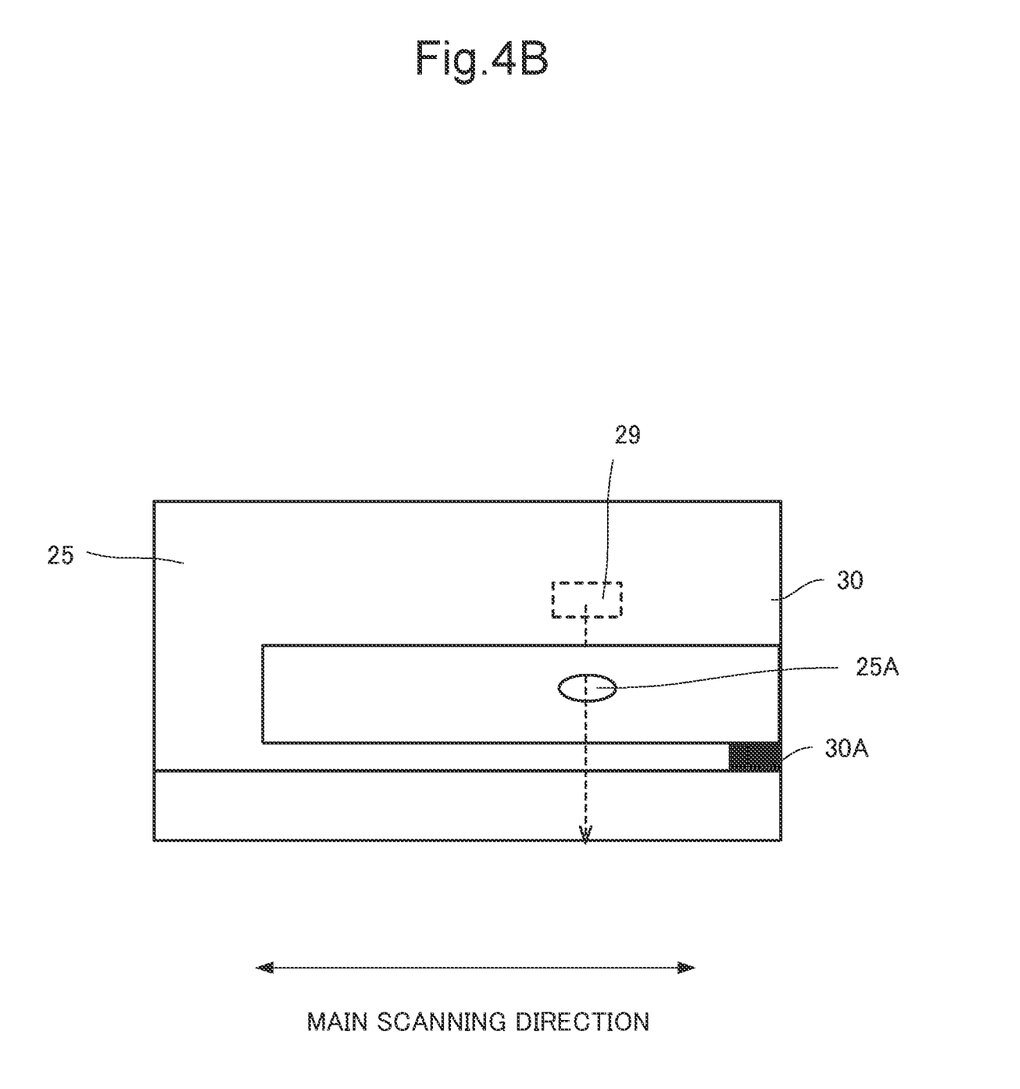
FIG. 4B is a side view showing the document transport device, in the state where the first discharge tray is open.

Hereunder, the configuration of the document transport device 6 and the image reading device 11 will be described in detail. FIG. 3A and FIG. 3B are cross-sectional views each showing the document transport device 6 and the image reading device 11. FIG. 4A and FIG. 4B are side views each showing the document transport device 6. As shown in FIG. 3A and FIG. 3B, the image reading device 11 includes a first reading device 40 incorporated in the document transport device 6, and a second reading device 50.

Configuration of Document Transport Device 6

The document transport device 6 includes a document tray 24, a first discharge tray 25 and a second discharge tray 26, a first transport route F1 and a second transport route F2, a switching device 27, a transport device 28, a range sensor 29, a sheet feeder cover 30, and document sensors 60A and 60B. The document transport device 6 is openably connected to the upper face of the second reading device 50, for example via a hinge. The document transport device 6 serves as a document retention cover for holding the document MS placed on the contact glass 52.

On the document tray 24, one or more documents MS are placed. To the first discharge tray 25 and the second discharge tray 26, the document MS is discharged. The first transport route F1 is a straight path formed so as to extend, without being curved, from the document tray 24 to the first discharge tray 25. The second transport route F2 is a U-shaped path branched from the first transport route F1, at a position downstream of the first reading device in the document transport direction, and formed so as to extend in a curved shape toward the second discharge tray 26.

The switching device 27 includes a nail element formed at the branch point between the first transport route F1 and the second transport route F2. The switching device 27 serves to switch the document transport direction beyond the branch point, between the first transport route F1 and the second transport route F2. The transport device 28 includes a pickup roller 31, a feeding roller pair 32, a shading roller 33, a plurality of transport roller pairs 34, a first discharge roller pair 35, and a second discharge roller pair 36.

The pickup roller 31 draws out the documents MS placed on the document tray 24 one by one, and delivers the document MS to the feeding roller pair 32. The feeding roller pair 32 feeds the document MS delivered from the pickup roller 31, to the document transport route F1. The shading roller 33 is opposed to the first reading device 40. The plurality of transport roller pairs 34 are provided along the first transport route F1 and the second transport route F2.

The shading roller 33 and the plurality of transport roller pairs 34 transport the document MS delivered by the feeding roller pair 32, along the first transport route F1 and the second transport route F2. The first discharge roller pair 35 discharges the document MS transported along the first transport route F1, to the first discharge tray 25. The second discharge roller pair 36 discharges the document MS transported along the second transport route F2, to the second discharge tray 26.

The transport device 28 horizontally transports the document MS from the document tray 24 to the first discharge tray 25, through the first transport route F1, when the document transport direction is switched to the first transport route F1 by the switching device 27. When the document transport direction is switched to the second transport route F2 by the switching device 27, the transport device 28 transports the document MS from the document tray 24 to the branch point through the first transport route F1, and then from the branch point to the second discharge tray 26, through the second transport route F2.

Hereunder, the first discharge tray 25 will be described in further detail. The first discharge tray 25 is mounted so as to pivot about a predetermined first pivotal shaft X1, extending in the main scanning direction, for example by means of a hinge mechanism. The first discharge tray 25 can assume, by being made to pivot, a closed state shown in FIG. 3A or an open state shown in FIG. 3B. When the first discharge tray 25 is in the open state, the document MS that has been discharged can be placed thereon. In addition, as shown in FIG. 4A and FIG. 4B, an opening 25A is formed in the first discharge tray 25. Further, the first discharge tray 25 is mounted so as to slide in the main scanning direction.

The range sensor 29 serves to detect the status of the first discharge tray 25. In this embodiment, the range sensor 29 is constituted of a reflective optical sensor including a light emitter that emits light to the opening 25A of the first discharge tray 25 in the open state, such that the emitted light passes through the opening 25A, and a photodetector that receives the light reflected by the document MS placed on the first discharge tray 25 in the open state. The controller 10 calculates a distance to the reflecting object, on the basis of a phase shift between the light emitted from the light emitter and the reflected light received by the photodetector. The range sensor 29 exemplifies the first detection device according to the disclosure.

The sheet feeder cover 30 constitutes a part of a casing 37, accommodating therein the first transport route F1, the first reading device 40, and the transport device 28. The sheet feeder cover 30 includes the first pivotal shaft X1. In other words, the sheet feeder cover 30 supports the first discharge tray 25 so as to pivot about the first pivotal shaft X1, and to extend outward from the first discharge tray 25. The sheet feeder cover 30 is mounted so as to pivot about a predetermined second pivotal shaft X2 extending parallel to the first pivotal shaft X1, for example by means of a hinge mechanism.

Figure 6:
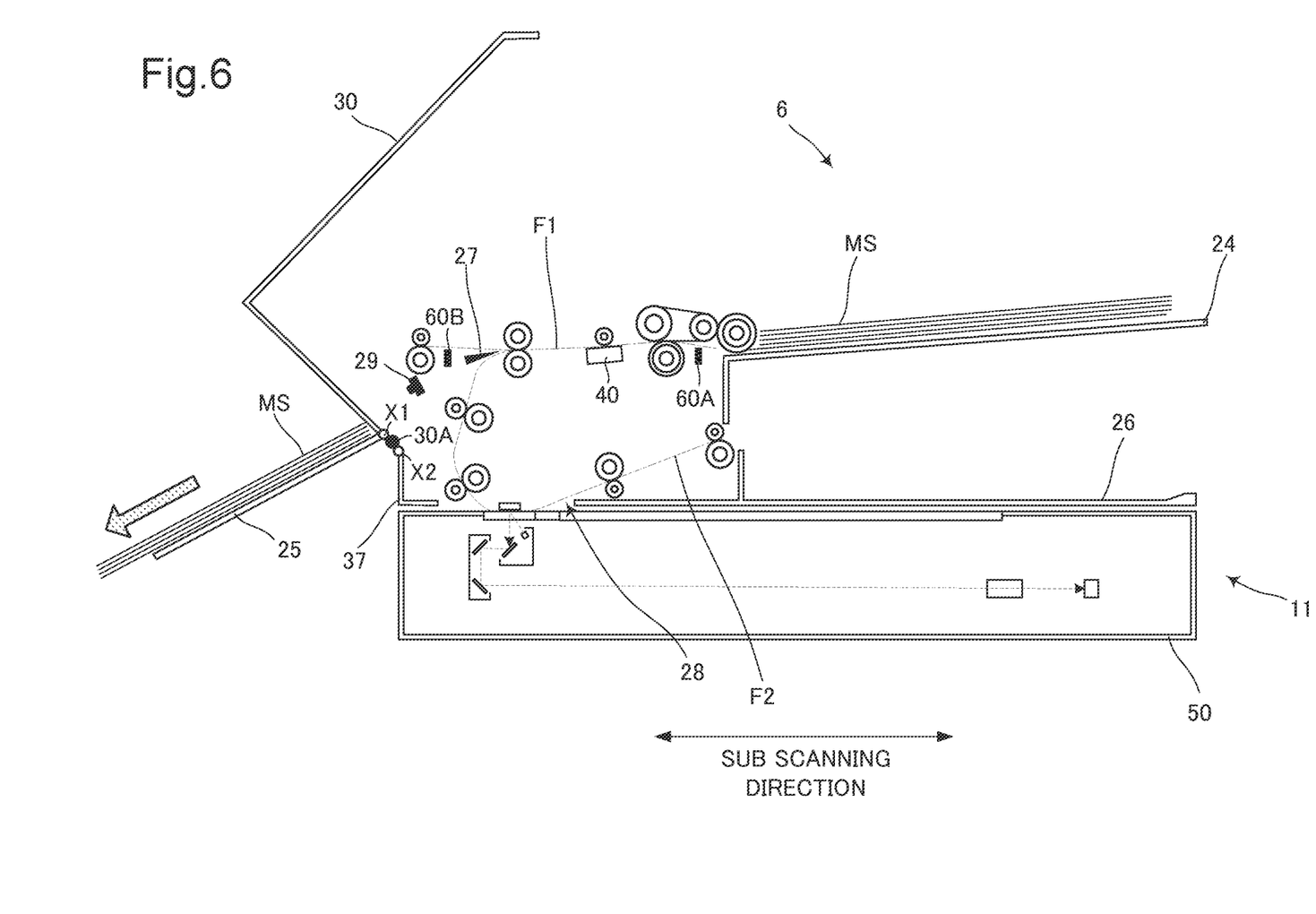
FIG. 6 is a cross-sectional view showing documents falling from the first discharge tray, when the sheet feeder cover is made to pivot.

The sheet feeder cover 30 can assume, by being made to pivot, a closed state shown in FIG. 3A and FIG. 3B, or an open state shown in FIG. 6, with respect to the casing 37. In the closed state, the sheet feeder cover 30 covers from above the components provided inside the casing 37, such as the first transport route F1, the first reading device 40, and the transport device 28. In the open state, the sheet feeder cover 30 exposes those components provided inside the casing 37.

The first discharge tray 25 is shorter in length in the main scanning direction, than the sheet feeder cover 30. To assume the closed state, the first discharge tray 25 is folded so as to reduce the length thereof, and accommodated in a recess formed in the surface of the sheet feeder cover 30. As shown in FIG. 4A, the first discharge tray 25 is located in a predetermined first position such that, in the closed state, the opening 25A and the range sensor 29 are deviated from each other in the main scanning direction. In this state, the optical path of the range sensor 29 is blocked by the first discharge tray 25.

The first discharge tray 25 is mounted on the sheet feeder cover 30, so as to slide in a direction indicated by an arrow in FIG. 4A (e.g., horizontally in the main scanning direction), in the closed state. The first discharge tray 25 can be made to slide to a predetermined second position, where the opening 25A and the range sensor 29 coincide with each other in the main scanning direction. In the second position, the first discharge tray 25 can be moved toward and away from the sheet feeder cover 30. A stopper 30A, for preventing the first discharge tray 25 from pivoting further, is provided on the side face of the sheet feeder cover 30, at a position on the lower side of the first pivotal shaft X1.

To open the first discharge tray 25, at first the user slides the first discharge tray 25 in the closed state in the direction indicated by the arrow in FIG. 4A (i.e., main scanning direction), to the second position shown in FIG. 4B. Then the user makes the first discharge tray 25 to a predetermined third position, where the first discharge tray 25 is restricted from pivoting further by the stopper 30A. Thus, the first discharge tray 25 assumes the open state. At this point, the opening 25A of the first discharge tray 25 is located so as to allow the light from the light emitter of the range sensor 29 to pass therethrough.

The document sensors 60A and 60B each detect whether the document MS is present on the first transport route F1. Although the type of the document sensors 60A and 60B is not specifically limited, provided that the sensor can detect the presence of the document MS, a reflective optical sensor, having a light emitter and a photodetector, is employed in this embodiment. The document sensors 60A and 60B are located on the upstream side and the downstream side in the document transport direction respectively, along the first transport route F1. The document sensors 60A and 60B each output an OFF-signal when the document MS is not detected, and output an ON-signal upon detecting the document MS. The controller 10 detects a transport error of the document MS on the first transport route F1, on the basis of the detection result from the document sensors 60A and 60B. The document sensors 60A and 60B and the controller 10 exemplify the second detection device according to the disclosure.

Configuration of Image Reading Device 11

The first reading device 40 includes a contact image sensor (CIS) provided on the first transport route F1. The first reading device 40 reads the image on one face (in this case, lower face) of the document MS. To be more specific, the first reading device 40 emits light, for example from a light emitting diode (LED), to the one face of the document MS being transported along the first transport route F1 in the moving document reading operation, and receives the light reflected by the one face, with a complementary metal-oxide semiconductor (CMOS) image sensor, thereby reading the image on the one face.

The second reading device 50 includes a contact glass 51, a contact glass 52, a white reference plate 53, a carriage 54, an optical unit 55, a condenser lens 56, and a charge-coupled device (CCD) sensor 57. The carriage 54 includes a line-shaped light emitting diode (LED) array 54A that emits light to the document MS, and a mirror 54B that receives the light reflected by the document MS, and reflects such light to the optical unit 55.

The optical unit 55 includes mirrors 55A and 55B. The mirror 55A reflects the light from the mirror 54B, to the mirror 55B. The mirror 55B reflects the light from the mirror 55A to the CCD sensor 57, through the condenser lens 56. The carriage 54 and the optical unit 55 can be made to reciprocate in the sub scanning direction, by a moving mechanism.

The second reading device 50 serves to read the image on the other face of the document MS (in this case, upper face), being transported along the second transport route F2 in the moving document reading operation. To be more specific, the second reading device 50 emits the light from the LED array 54A to the other face of the document MS passing over the contact glass 51, with the carriage 54 and the optical unit 55 fixed at a home position shown in FIG. 3A and FIG. 3B, and reads the image on the other face, with the CCD sensor 57.

In the fixed document reading operation, the second reading device 50 reads the image on one face of the document MS placed on the contact glass 52. To be more specific, the second reading device 50 emits the light from the LED array 54A to the one face of the document MS placed on the contact glass 52, while moving the carriage 54 and the optical unit 55 in the sub scanning direction at a constant speed, and reads the image on the one face, with the CCD sensor 57.

In this embodiment, the controller 10 executes, by operating according to the transport control program, the horizontal transport operation including restricting the transport device 28 from transporting the document MS, upon deciding that the first discharge tray 25 is in one of the closed state and a full state, on the basis of the detection result from the range sensor 29, and allowing the transport device 28 to transport the document MS, upon deciding that the first discharge tray 25 is neither in the closed state nor in the full state.

Operation

Figure 5:
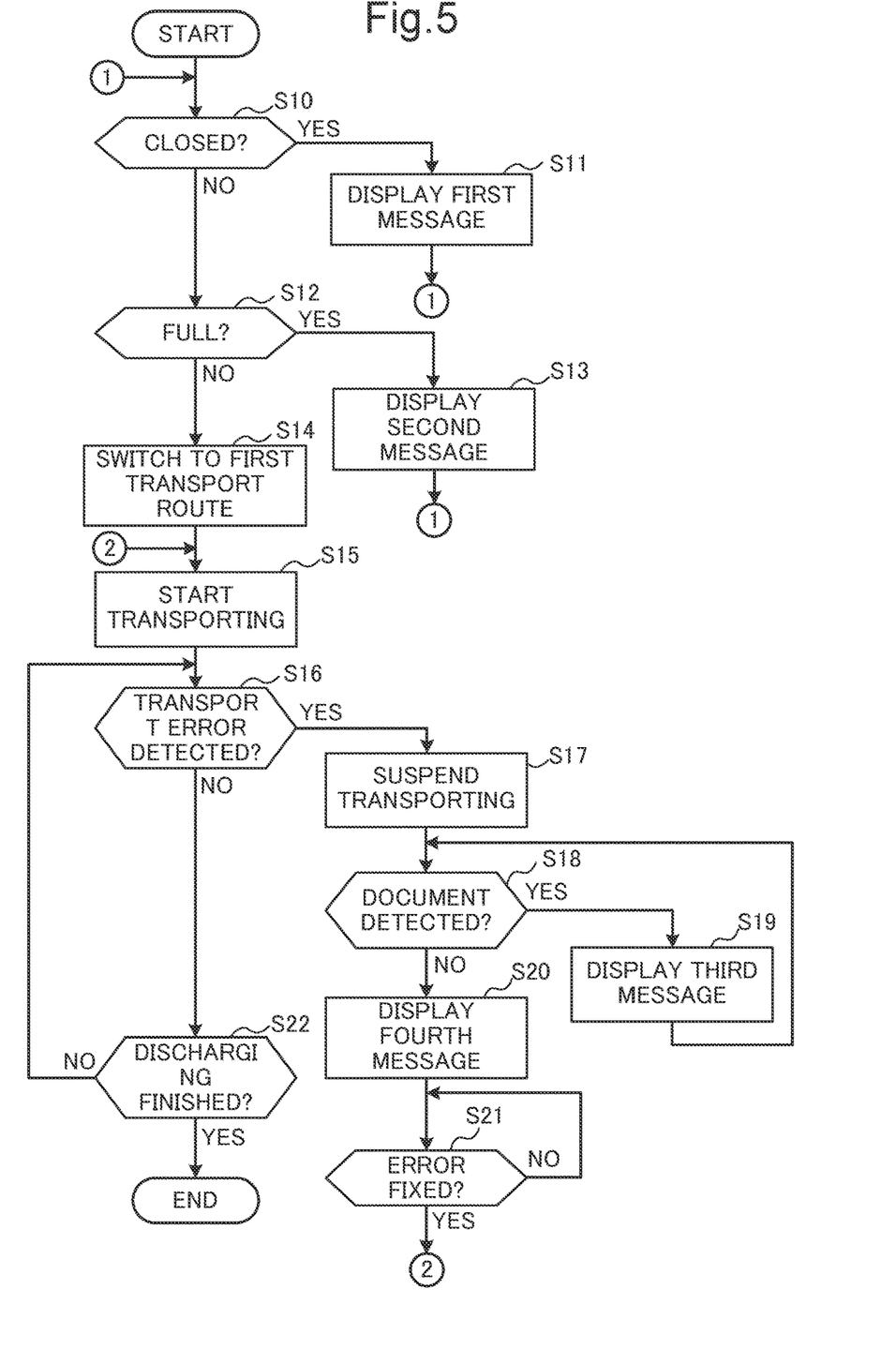
FIG. 5 is a flowchart showing a horizontal transport operation.

FIG. 5 is a flowchart showing the horizontal transport operation. Referring to FIG. 5, the operation performed by the document reading apparatus 5 to execute the horizontal transport operation will be described hereunder. For the following description, it will be assumed that the controller 10 sets the switching device 27 so as to guide the document MS to the second transport route F2 from the branch point, in the initial state.

For example, the user places a plurality of documents MS on the document tray 24 in a face-down orientation, and inputs the instruction to execute a simplex reading operation and designating the first discharge tray 25 as the destination of the document MS, through the operation device 16. Upon receipt of the instruction (i.e., instruction to read the document with the first reading device 40) through the operation device 16, the controller 10 starts to execute the horizontal transport operation shown in FIG. 5. As a first step of the horizontal transport operation, the controller 10 decides whether the first discharge tray 25 is in the closed state, on the basis of the detection result from the range sensor 29 (step S10).

To be more specific, the controller 10 calculates the distance to the reflecting object on the basis of the detection result from the range sensor 29, to thereby decide that the first discharge tray 25 is in the closed state when the calculated distance is shorter than a first threshold, and decide that otherwise the first discharge tray 25 is not in the closed state. Although the first threshold is not specifically limited provided that the value enables the first discharge tray 25 to be decided as in closed state, in this embodiment the first threshold is set to 0.5 (cm) in advance, by the controller 10.

(1) When First Discharge Tray 25 is in Closed State

When the first discharge tray 25 is in the closed state, the distance between the first discharge tray 25 and the range sensor 29 is shorter than 0.5 cm. Accordingly, upon calculating a value smaller than the first threshold (e.g., 0.3 cm) as the distance to the reflecting object, on the basis of the detection result from the range sensor 29, the controller 10 decides that the first discharge tray 25 is in the closed state (YES at step S10), and causes the display device 15 to display a first message urging the user to open the first discharge tray 25, such as "Please open the discharge tray", without allowing the transport device 28 to start to transport the document MS (step S11). After step S11, the controller 10 returns to step S10.

(2) When First Discharge Tray 25 is in Open State

When the first discharge tray 25 is in the open state, and one or more documents MS are on the first discharge tray 25, the distance between the uppermost one of the documents MS on the first discharge tray 25 and the range sensor 29 is equal to or longer than 0.5 cm. In this case, therefore, the controller 10 calculates a value equal to or longer than first threshold, as the distance to the reflecting object. On the other hand, when no document MS is on the first discharge tray 25, the light from the light emitter of the range sensor 29 passes through the opening 25A of the discharge tray 25, and therefore the photodetector does not receive the reflected light. Accordingly, the controller 10 does not calculate the distance to the reflecting object, since no detection result is available from the range sensor 29.

In either of the mentioned cases, the controller 10 decides that the first discharge tray 25 is not in the closed state (NO at step S10), and decides whether the first discharge tray 25 is in the full state, on the basis of the detection result from the range sensor 29 (step S12). To be more specific, the controller 10 decides that the first discharge tray 25 is in the full state, when the distance to the reflecting object, calculated at step S10, is shorter than a predetermined second threshold, longer than the first threshold, and decides that otherwise the first discharge tray 25 is not in the full state. The second threshold is not specifically limited provided that the value enables the first discharge tray 25 to be decided as in the full state, in this embodiment the second threshold is set to 2.0 (cm) in advance, by the controller 10.

(2-1) When First Discharge Tray 25 is in Full State

When the first discharge tray 25 is in the full state, the distance between the uppermost one of the documents MS and the range sensor 29 is shorter than 2.0 cm. Accordingly, upon calculating a value smaller than the second threshold (e.g., 1.9 cm) as the distance to the reflecting object, on the basis of the detection result from the range sensor 29, the controller 10 decides that the first discharge tray 25 is in the full state (YES at step S12), and causes the display device 15 to display a second message urging the user to cancel the full state of the first discharge tray 25, such as "Please remove the documents from discharge tray", without allowing the transport device 28 to start to transport the document MS (step S13). After step S13, the controller 10 returns to step S10.

(2-2) When First Discharge Tray 25 is not in Full State

When the documents MS are on the first discharge tray 25, but not to the full state, the distance between the uppermost one of the documents MS on the first discharge tray 25 and the range sensor 29 is equal to or longer than 2.0 cm. In this case, accordingly, the controller 10 calculates a value equal to or longer than the second threshold as the distance to the reflecting object, on the basis of the detection result from the range sensor 29. When no document MS is on the first discharge tray 25, the light from the light emitter of the range sensor 29 passes through the opening 25A of the discharge tray 25, and therefore the photodetector does not receive the reflected light. Accordingly, the controller 10 does not calculate the distance to the reflecting object, since no detection result is available from the range sensor 29.

In either of the mentioned cases, the controller 10 decides that the first discharge tray 25 is not in the full state (NO at step S12), and shifts the position of the switching device 27, so as to switch the document transport direction beyond the branch point, to the first transport route F1 (step S14). After step S14, the controller 10 allows the transport device 28 to start to transport the document MS (step S15).

To be more specific, the controller 10 causes the pickup roller 31 and the feeding roller pair 32 to feed the documents MS one by one to the document transport route F1, and causes the shading roller 33 and the transport roller pair 34 to horizontally transport the document MS delivered as above, along the first transport route F1. The controller 10 then causes the first reading device 40 to read the image on one face (in this case, lower face) of the document MS being transported along the first transport route F1. Then the controller 10 causes the first discharge roller pair 35 to discharge the document MS that has passed the first reading device 40, to the first discharge tray 25.

After step S15, the controller 10 keeps deciding that the discharging of all the documents MS has not been finished (NO at step S22), until all of the documents MS are discharged, and decides whether a transport error has occurred, on the basis of the detection result from the document sensors 60A and 60B (step S16). To be more specific, the controller 10 decides that the transport error has occurred, in the case where the ON-signal has not been inputted from the document sensor 60B, within a predetermined time after the ON-signal was inputted from the document sensor 60A, and decides that otherwise the transport error is not occurring.

(3) When Transport Error is Detected

In the case where paper jam of the document MS occurs on the document transport route F1, and the ON-signal has not been inputted from the document sensor 60B, within the predetermined time after the ON-signal was inputted from the document sensor 60A, document sensor 60A, the controller 10 decides that the transport error has occurred (YES at step S16), and causes the transport device 28 to suspend transporting the document MS (step S17).

After step S17, the controller 10 decides whether any documents MS are on the first discharge tray 25, on the basis of the detection result from the range sensor 29 (step S18). To be more specific, the controller 10 decides that no document MS is on the first discharge tray 25, when no detection result is available because the photodetector of the range sensor 29 does not receive the reflected light, and decides that otherwise (i.e., when the photodetector is receiving the reflected light) one or more documents MS are on the first discharge tray 25.

(3-1) When Documents MS are on Discharge Tray 25

When one or more documents MS are on the discharge tray 25, the light from the light emitter of the range sensor 29 is reflected by the document MS on the discharge tray 25, so that the photodetector receives the reflected light, and outputs the detection result. Accordingly, the controller 10 decides that one or more documents MS are on the first discharge tray 25 (YES at step S18), and causes the display device 15 to display a third message urging the user to remove all the documents MS on the first discharge tray 25, such as "Please remove all documents from discharge tray" (step S19). After step S19, the controller 10 returns to step S18.

(3-2) When No Document MS is on Discharge Tray 25

When no document MS is on the discharge tray 25, since the light from the light emitter of the range sensor 29 passes through the opening 25A of the discharge tray 25, the photodetector does not receive the reflected light, and therefore the controller 10 is unable to acquire the detection result. Accordingly, the controller 10 decides that no document MS is on the first discharge tray 25 (NO at step S18), and causes the display device 15 to display a fourth message urging the user to set the sheet feeder cover 30 to the open state, such as "Please open sheet feeder cover and remove document" (step S20).

After step S20, the controller 10 repeatedly decides that the transport error has not been fixed (NO at step S21), until an input indicating that the transport error has been fixed is received through the operation device 16 (e.g., press of the start key 16A). It will be assumed here that, for example, the user has opened the sheet feeder cover 30 and removed the document MS causing the paper jam, and then pressed down the start key 16A.

Upon detecting that the start key 16A has been pressed, the controller 10 decides that the transport error has been fixed (YES at step S21), and returns to step S15. When all of the documents MS are discharged through the first discharge roller pair 35 (YES at step S22), without the transport error having been detected on the basis of the detection result from the document sensors 60A and 60B (NO at step S16), the controller 10 finishes the horizontal transport operation.

Now, the documents to be transported through the horizontal transport route are often valuable documents, such as a business card and a license. When a paper jam occurs on the transport route, while such type of document is being transported, the valuable document may be damaged. The aforementioned existing technique is unable to cope with such a trouble.

With the arrangement according to this embodiment, in contrast, upon deciding, when the instruction to read the document with the first reading device 40 is inputted through the operation device 16, that the first discharge tray 25 is either in the closed state or in the full state, on the basis of the detection result from the range sensor 29, the controller 10 restricts the transport device 28 from transporting the document MS, and the first reading device 40 from reading the image. On the other hand, upon deciding that the first discharge tray 25 is neither in the closed state nor in the full state, the controller 10 allows the transport device 28 to transport the document MS, and the first reading device 40 to read the image.

As described above, the document MS is kept from being transported, when the first discharge tray 25 is either in the closed state or in the full state, in other words the transport of the document MS is highly likely to cause the paper jam, and therefore the occurrence of the jam of the document MS on the first transport route F1 can be prevented. Therefore, the jam of the document MS transported through the horizontal transport route can be prevented.

According to the foregoing embodiment, in addition, the controller 10 causes the display device 15 to display the first message urging the user to set the first discharge tray 25 to the open state, upon deciding that the first discharge tray 25 is in the closed state, on the basis of the detection result from the range sensor 29, when the instruction to read the document with the first reading device 40 is inputted through the operation device 16. Upon deciding that the first discharge tray 25 is in the full state, the controller 10 causes the display device 15 to display the second message, urging the user to cancel the full state of the first discharge tray 25.

Thus, the possible cause of the jam of the document MS can be eliminated in advance, which further assures that the jam of the document MS on the first transport route F1 can be avoided.

Here, when the sheet feeder cover 30 is set to the open state, with the documents MS loaded on the first discharge tray 25 as shown in FIG. 6, the first discharge tray 25 is inclined owing to the pivotal action of the sheet feeder cover 30, which causes the documents MS on the first discharge tray 25 to fall down therefrom.

According to the foregoing embodiment, however, upon detecting the transport error on the basis of the detection result from the document sensors 60A and 60B, and detecting, under such situation, that one or more documents MS are on the first discharge tray 25, on the basis of the detection result from the range sensor 29, the controller 10 causes the display device 15 to display the third message urging the user to remove all the documents MS from the first discharge tray 25. Upon detecting, after detecting the transport error, that no document MS is on the first discharge tray 25, the controller 10 causes the display device 15 to display the fourth message, urging the user to set the sheet feeder cover 30 to the open state.

The mentioned arrangement prevents the sheet feeder cover 30 from being opened, when one or more documents MS are loaded on the first discharge tray 25, thereby preventing the documents MS on the first discharge tray 25 from falling down therefrom.

According to the foregoing embodiment, further, the controller 10 calculates the distance to the reflecting object on the basis of the detection result from the range sensor 29, and detects that the first discharge tray 25 is in the closed state, when the distance to the reflecting object is shorter than the first threshold. When the distance to the reflecting object is equal to or longer than the first threshold, but shorter than the second threshold, the controller 10 detects that the first discharge tray 25 is in the full state. When the distance to the reflecting object is equal to or longer than the second threshold, or when the photodetector does not receive the reflected light, the controller 10 does not detect the closed state and the full state. Further, when the photodetector of the range sensor 29 does not receive the reflected light, the controller 10 detects that no document MS is on the first discharge tray 25, but detects that one or more documents MS are on the first discharge tray 25, when the photodetector is receiving the reflected light.

As described above, various types of status of the first discharge tray 25 can be detected with the single range sensor 29. Therefore, the number of parts can be reduced, which leads to reduced production cost, compared with the case where different sensors are provided for the respective types of the status.

Other Variations

Figure 7:
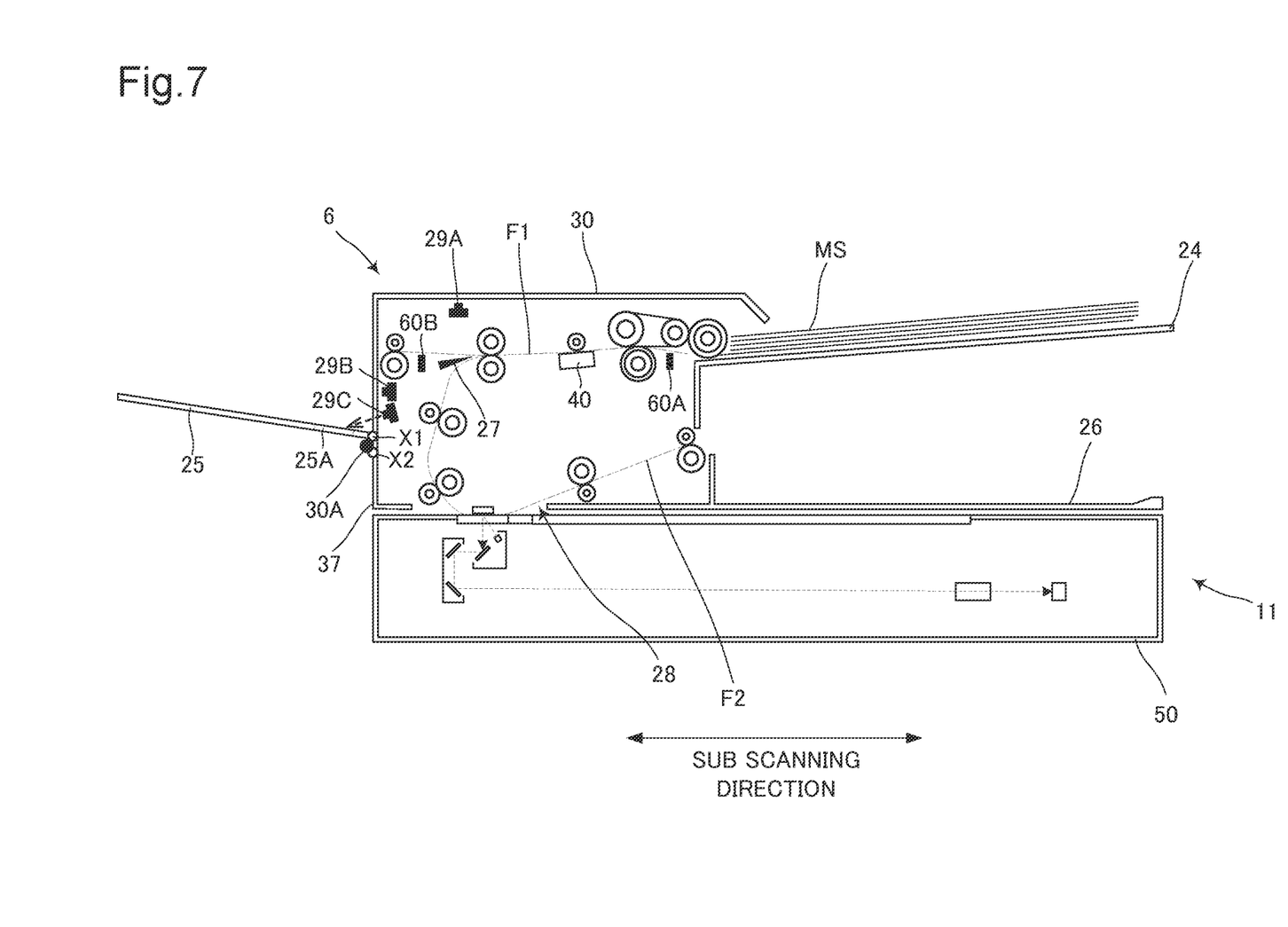
FIG. 7 is a cross-sectional view showing another example of a first detection device.

Although the first detection device is exemplified by the range sensor 29 in the foregoing embodiment, the disclosure is not limited to such embodiment. For example, as shown in FIG. 7, a first sensor 29A for detecting whether the first discharge tray 25 is open or closed, a second sensor 29B for detecting the full state of the first discharge tray 25, and a third sensor 29C for detecting whether one or more documents are on the first discharge tray 25, may be provided as the first detection device. Although the type of the first sensor 29A, the second sensor 29B, and the third sensor 29C is not specifically limited, for example a reflective optical sensor having a light emitter and a photodetector may be employed.

Further, although the image forming device 12 is configured to form an image on the recording sheet P in the foregoing embodiment, the disclosure is not limited to such an embodiment. The image forming device 12 may form an image on a different type of recording medium, such as an overhead projector (OHP) sheet, without limitation to the recording sheet.

The disclosure may be modified in various manners, without limitation to the configuration according to the foregoing embodiment. For example, although the image forming apparatus including the document reading apparatus is exemplified by the color multifunction peripheral in the embodiment, a different type of image forming apparatus, such as a monochrome multifunction peripheral, a copier, or a facsimile machine, may be employed.

The configurations and processings of the first and second embodiments, described with reference to FIG. 1 to FIG. 7, are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A document reading apparatus comprising:
    a document tray on which a document is placed;
    a first discharge tray that assumes one of a closed state and an open state, by being made to pivot about a predetermined first pivotal shaft;
    a first transport route extending from the document tray to the first discharge tray, without being curved;
    a first reading device provided on the first transport route, and configured to read an image on one face of the document;
    a transport device that transports the document from the document tray to the first discharge tray, through the first transport route;
    an input device to which an instruction from a user is inputted;
    a first detection device that detects a status of the first discharge tray; and
    a control device including a processor, and configured to act, when the processor executes a control program, as a controller that, in a case where an instruction to read the document with the first reading device is inputted to the input device, restricts the transport device from transporting the document and the first reading device from reading the image, when one of the closed state and a full state of the first discharge tray is detected by the first detection device, and allows the transport device to transport the document and the first reading device to read the image, when neither of the closed state and the full state is detected by the first detection device.

2. The document reading apparatus according to claim 1, further comprising a display device,
    wherein, in a case where the instruction to read the document with the first reading device is inputted to the input device, the controller causes the display device to display a first message urging the user to set the first discharge tray to the open state, when the first detection device detects the closed state, and causes the display device to display a second message urging the user to cancel the full state, when the first detection device detects the full state.

3. The document reading apparatus according to claim 1, further comprising:
    a display device;
    a sheet feeder cover constituting a part of a casing accommodating therein the first transport route, the first reading device, and the transport device, supporting the first discharge tray so as to pivot about the first pivotal shaft in a posture extending outward from the casing, configured to assume a closed state or an open state with respect to the casing, by being made to pivot about a predetermined second pivotal shaft extending parallel to the first pivotal shaft, and configured to cover the first transport route, the first reading device, and the transport device from above in the closed state, and to expose the first transport route, the first reading device, and the transport device in the open state; and a second detection device that detects a transport error of the document on the first transport route, wherein the controller is configured to:

cause the display device to display a third message urging the user to remove all the documents from the first discharge tray, when the second detection device detects the transport error, and the first detection device detects that the document is on the first discharge tray; and     cause the display device to display a fourth message urging the user to set the sheet feeder cover to the open state, when the second detection device detects the transport error, and the first detection device detects that no document is on the first discharge tray.

4. The document reading apparatus according to claim 3, wherein the first discharge tray includes an opening, the first detection device includes a range sensor, having a light emitter configured to emit light to the opening of the first discharge tray in the open state, and located such that the emitted light passes through the opening, and a photodetector that receives the light emitted and reflected by the document on the first discharge tray, and the controller is configured to:

calculate a distance to a reflecting object, on a basis of a detection result from the range sensor;

detect the closed state of the first discharge tray, when the distance to the reflecting object is shorter than a predetermined first threshold;

detect the full state of the first discharge tray, when the distance to the reflecting object is equal to or longer than the first threshold, and shorter than a predetermined second threshold longer than the first threshold;

keep from detecting the closed state and the full state, when the distance to the reflecting object is equal to or longer than the second threshold, or when the photodetector is unable to receive the reflected light; and     detect that no document is on the first discharge tray, when the photodetector is unable to receive the reflected light, and detect that the document is on the first discharge tray, when the photodetector receives the reflected light.

5. The document reading apparatus according to claim 4, wherein the first discharge tray is located at a predetermined first position where, in the closed state, the opening and the range sensor are deviated from each other, and configured to slide to a predetermined second position where the opening and the range sensor coincide with each other, and the first discharge tray is movable toward and away from the sheet feeder cover, when located in the second position.

6. An image forming apparatus comprising:

the document reading apparatus according to claim 1; and an image forming device that forms an image read by the document reading apparatus, on a recording medium.

\* \* \* \* \*